(12) United States Patent
Nammi et al.

(10) Patent No.: US 10,568,082 B2
(45) Date of Patent: Feb. 18, 2020

(54) REDUCING HIGHER LAYER SIGNALING OVERHEAD IN MULTIANTENNA WIRELESS COMMUNICATION SYSTEMS

(71) Applicant: AT&T Intellectual Property I, L.P., Atlanta, GA (US)

(72) Inventors: SaiRamesh Nammi, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 20 days.

(21) Appl. No.: 15/698,928

(22) Filed: Sep. 8, 2017

(65) Prior Publication Data

US 2019/0082424 A1    Mar. 14, 2019

(51) Int. Cl.
*H04W 72/04* (2009.01)
*H04L 5/00* (2006.01)
(Continued)

(52) U.S. Cl.
CPC ........ *H04W 72/042* (2013.01); *H04B 7/0486* (2013.01); *H04L 5/001* (2013.01); *H04L 5/0023* (2013.01); *H04L 5/0092* (2013.01); *H04W 28/06* (2013.01); *H04L 1/0031* (2013.01); *H04L 5/0048* (2013.01)

(58) Field of Classification Search
CPC .... H04W 72/042; H04W 28/06; H04L 5/001; H04L 1/0031; H04L 5/0023; H04L 5/0048; H04L 5/0092; H04B 7/0486
See application file for complete search history.

(56) References Cited

U.S. PATENT DOCUMENTS

| 8,976,753 B2 | 3/2015 | Kim et al. |
| 8,976,839 B2 | 3/2015 | Chen et al. |

(Continued)

FOREIGN PATENT DOCUMENTS

WO    2017095305    6/2017

OTHER PUBLICATIONS

International Search Report and Written Opinion for International Application Serial No. PCT/US2018/050104 dated Dec. 6, 2018, 17 pages.
(Continued)

*Primary Examiner* — Steven H Nguyen
(74) *Attorney, Agent, or Firm* — Amin, Turocy & Watson, LLP

(57) ABSTRACT

Various embodiments disclosed herein provide for reduced overhead signaling when a user equipment device is being configured with multiple bandwidth parts for downlink transmission. When a user equipment device is being configured with multiple bandwidth parts (channels on an aggregate carrier), the signaling that indicates the codebook subset restriction bit map, rank restriction bit map, and beam restriction bit map needs to be repeated for each bandwidth part. Often however, the restriction bit maps are repeated in the bandwidth parts, and so overhead can be reduced by encoding a confirmation bit in each bandwidth part, such that if the confirmation bit is set to "1", the user equipment device can know to apply the restriction bit map from the primary bandwidth part to the secondary bandwidth part, without having to encode the secondary bandwidth part restriction bit map.

20 Claims, 10 Drawing Sheets

(51) Int. Cl.
  *H04B 7/0456* (2017.01)
  *H04W 28/06* (2009.01)
  *H04L 1/00* (2006.01)

(56) References Cited

U.S. PATENT DOCUMENTS

| | | | |
|---|---|---|---|
| 9,136,924 B2 | 9/2015 | Park | |
| 9,172,448 B2 | 10/2015 | Shimezawa et al. | |
| 9,325,402 B2 | 4/2016 | Han et al. | |
| 9,515,711 B2* | 12/2016 | Yum | H04B 7/0456 |
| 9,531,454 B2 | 12/2016 | Shi et al. | |
| 9,698,888 B2 | 7/2017 | Ko et al. | |
| 9,736,834 B2 | 8/2017 | Davydov et al. | |
| 9,755,721 B2 | 9/2017 | Kim et al. | |
| 2012/0328031 A1* | 12/2012 | Pajukoski | H04L 25/03942 375/259 |
| 2013/0176952 A1* | 7/2013 | Shin | H04L 5/001 370/329 |
| 2016/0149628 A1* | 5/2016 | Davydov | H04B 7/0626 370/329 |
| 2016/0329937 A1* | 11/2016 | Shi | H04B 7/0417 |
| 2016/0345309 A1* | 11/2016 | Xiong | H04J 11/0053 |
| 2016/0360451 A1* | 12/2016 | Shi | H04B 7/0456 |
| 2019/0068256 A1* | 2/2019 | Muruganathan | H04B 7/0626 |

OTHER PUBLICATIONS

Intel Ericsson LGE AT&T ZTE CATT, "WF on codebook subset restriction for NR," vol. RAN WG1, Aug. 26, 2017, 4 pages.

3rd Generation Partnership Project, "Technical Specification Group Radio Access Network," Study on New Radio (NR) access technology (Release 14), © 2017, 74 pages.

AT&T, "On Codebook subset restriction for NR," vol. RAN WG1, Sep. 12, 2017, 3 pages.

* cited by examiner

US 10,568,082 B2

REDUCING HIGHER LAYER SIGNALING OVERHEAD IN MULTIANTENNA WIRELESS COMMUNICATION SYSTEMS

TECHNICAL FIELD

The present application relates generally to the field of mobile communication and, more specifically, to reducing overhead in higher layer signaling in a next generation wireless communications network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
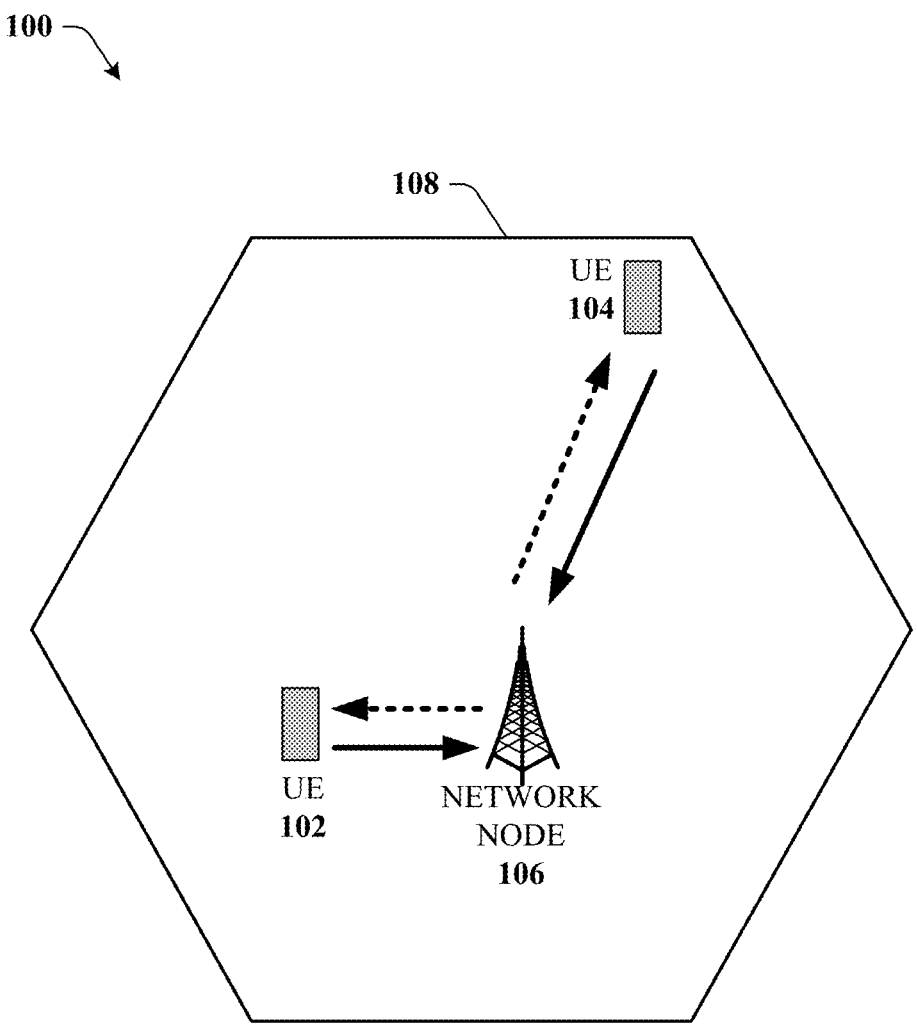
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

In various embodiments, a base station device can comprise a processor and a memory that stores executable instructions that, when executed by the processor facilitate performance of operations. The operations can comprise configuring a first restriction bit map associated with a radio resource control parameter for a user equipment device in a first bandwidth part of a component carrier. The operations can also comprise determining that a second bandwidth part of the component carrier comprises a second restriction bit map that matches the first restriction bit map. The operations can also comprise encoding an indicator in the second bandwidth part indicating to the user equipment device to use the first restriction bit map for the second bandwidth part.

In another embodiment, method comprises determining, by a transceiver device comprising a processor, that a secondary channel of an group of channels has a similar radio resource configuration for a radio resource as a primary channel of the group of channels. The method can also comprise encoding, by the transceiver device, a first restriction bit map associated with a control parameter applicable to the radio resource and the primary channel. The method can also comprise encoding, by the transceiver device, a confirmation bit in the secondary channel indicating to a receiver device to use the first restriction bit map for transmissions via the secondary channel.

In another embodiment machine-readable storage medium, comprising executable instructions that, when executed by a processor of a device, facilitate performance of operations. The operations can comprise determining that a second channel of an aggregate carrier has a similar radio resource configuration as a first channel. The operations can also comprise encoding a first restriction bit map associated with a radio resource control parameter for use with the first channel. The operations can also comprise encoding a confirmation bit in the second channel indicating to a receiver device to use the first restriction bit map for the second channel.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Various embodiments disclosed herein provide for reduced overhead signaling when a user equipment device is being configured with multiple bandwidth parts for downlink transmission. When a user equipment device is being configured with multiple bandwidth parts (channels on an aggregate carrier), the signaling that indicates the codebook subset restriction bit map, rank restriction bit map, and beam restriction bit map needs to be repeated for each bandwidth part. Often however, the restriction bit maps are repeated in the bandwidth parts, and so overhead can be reduced by encoding a confirmation bit in each bandwidth part, such that if the confirmation bit is set to "1", the user equipment device can know to apply the restriction bit map from the primary bandwidth part to the secondary bandwidth part, without having to encode the secondary bandwidth part restriction bit map.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

In an embodiment, network node can configure UEs 102 and 104 via a radio resource control (RRC) signaling, which can be higher layer signaling. The RRC signaling can configure the user and control plane according to the network status. The type of configuration can be based on the number of antennas on a transmitter of the network node 106 as well as other considerations. The information signaling during the RRC signaling can include Pre-coding Matrix Indicator (PMI) Rank Indicator (RI), and beam index estimation. In order to reduce overhead, and more efficiently manage resources, the network node 106 can configure restriction bit maps that limit the amount of information transmitted. According to 3GPP standards, a UE is restricted to report PMI, RI, and beam index estimation within a precoder codebook subset specified by a bitmap parameter codebookSubsetRestriction (for the case of PMI) configured by higher layer signaling. For a specific precoder codebook associated with the number of antenna ports, the bitmap can specify all possible precoder codebook subsets from which the UE should assume the network node 106 may be using when transmitting to the UE. For example, if the number of codebook elements defined for 2 Tx antenna ports is equal to 6+2. i.e. 6 precoding vectors for rank is equal to one and 2 precoding matrices for rank is equal to 2. Then the codebooksubset restriction bit map is equal to 8. Then the network can send a bit map equal to 8 and setting those bits so that the UE should assume those precoder elements in the CSI reporting. Similarly the codebook subset restriction is defined for 4 transmit and 8 transmit antenna ports.

The resulting number of bits for configured number of antenna ports is given in Table 1. The bitmap forms the bit sequence $a_{A_c-1}, \ldots, a_3, a_2, a_1, a_0$ where $a_0$ is the LSB and $a_{A_c-1}$ is the MSB and where a bit value of zero indicates that the PMI and RI reporting is not allowed to correspond to precoder(s) associated with the bit.

TABLE 1

Number of bits $A_c$

| Number of antenna ports | Length of bit map |
| --- | --- |
| 2 | 4 |
| 4 | 64 |
| 8 | 512 |

Similarly, the network can send rank restriction bit map equal to the number of antenna ports so that the UE assumes the network will schedule those ranks only for PDSCH transmission when it reports CSI. Table 2 shows bit map length for each antenna ports. Table 2 shows the rank restriction bit map for each antenna port. The same principle can be applied for beam restriction.

TABLE 2

Number of bits $A_c$

| Number of antenna ports | Length of bit map |
| --- | --- |
| 2 | 2 |
| 4 | 4 |
| 8 | 8 |

As can be seen in Tables 1 and 2, the size of the bit maps for the codebook subset restriction, rank restriction and beam restriction can be large, and consume a large amount of overhead if being signaled to the UEs 102 and 104 during each RRC signaling period.

In 5G systems furthermore, multiple channels may be included in an aggregate carrier channel. For instance, the component carrier bandwidth can be 400 MHz, and a UE may only use a subset of that bandwidth. Hence, for 5G systems, a UE can be configured with one or more carrier bandwidth parts in the downlink with a subset of carrier bandwidth parts being active at a given time. The UE is not expected to receive downlink control information or data outside an active bandwidth part. A UE can be configured with one or more carrier bandwidth parts in the uplink with a subset of carrier bandwidth parts being active at a given time. The UE may also not transmit uplink control information or uplink data outside an active bandwidth part. Each of the channels, or bandwidth parts on the aggregate carrier can be configured using a separate restriction bit map.

Often times however, the restriction bit maps, whether it is a codebook subset restriction bit map, rank restriction bit map, or beam restriction bit map, will be the same for multiple bandwidth parts. In order to reduce overhead, a confirmation bit can be encoded in the RRC signaling for each bandwidth part, where if the confirmation bit has a value of 1, the UE can use the restriction bit map from the primary bandwidth part for the secondary bandwidth part, and then the restriction bit map will not need to be transmitted in the secondary bandwidth part. In an embodiment, if there are four bandwidth parts, and they all have the same restriction bit maps, then only one restriction bit map will be transmitted during RRC signaling for the primary bandwidth part, while 3 confirmation bits can be encoded in the other bandwidth parts to indicate to the UE to use the primary bandwidth part's restriction bit map.

It is to be appreciated that while reference is made of this disclosure applying to downlink (e.g., base station to UE) configuration, in other embodiments, the techniques disclosed herein can apply to uplink communications as well.

Figure 2:
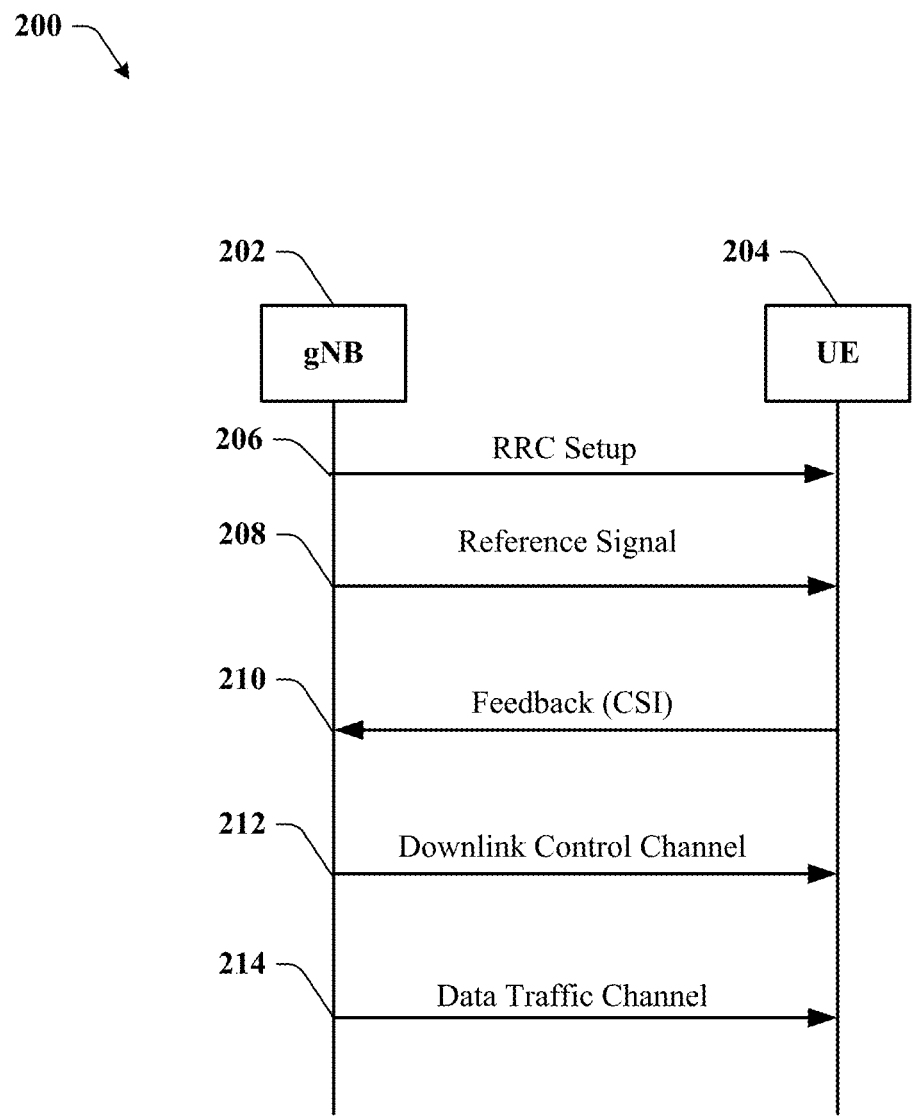
FIG. 2 illustrates an example block diagram of a message sequence chart in accordance with various aspects and embodiments of the subject disclosure.

Turning now to FIG. 2, illustrated is an example block diagram of a message sequence chart 200 in accordance with various aspects and embodiments of the subject disclosure.

The message sequence chart 200 can be between a gNodeB 202 and a UE 204 within the gNodeB 202 cell. The gNodeB 202 can configure the UE 204 during RRC setup 206 and set the PMI, RI, and beam index estimation to establish and facilitate the control plane and user plane transmissions. The RRC signaling can be part of any setup, confirm or reconfiguration message, for example, radio bearer set up, active set update message, cell update confirm, radio bearer reconfiguration, physical channel reconfiguration or transport channel reconfiguration. The gNodeB 202 can send a reference signal 206 (CSI-RS) to the UE 204. The reference signal 208 can be a pilot signal that is cellular specific or UE specific and is used by the UE 204 to acquire channel-state information (CSI) and beam specific information (beam RSRP). In 5G wireless networks, the CSI-RS is UE specific so it can have a significantly lower time/frequency density. The reference signal 208 can also include demodulation reference signals that are intended to be used by terminals for channel estimation for data channel. The label "UE-specific" relates to the fact that each demodulation reference signal is intended for channel estimation by a single terminal. That specific reference signal is then only transmitted within the resource blocks assigned for data traffic channel transmission to that terminal.

The UE 204 can send back a feedback signal 210 that comprises channel state information determined from the reference signal(s) 208. The channel state information can include a channel quality indicator, precoding matrix, rank information, and resource indicator (beam indicator). The rank indicator can indicate the number of layers that are supportable in transmissions between the gNodeB 202 and the UE 204. For instance, when the SINR is low, due to a function of low power, a large distance between the devices, path loss, and/or other interference, the rank indicator can be 1, indicating that only one layer can be supported. In other embodiments, when the SINR is high, the Rank can be two or four or higher, indicating that multiple data layers can be supported, allowing MIMO communications between the gNodeB 202 and the UE 204. From this channel state information and based on other scheduler inputs, the gNodeB 202 sends a downlink control channel 212 where the scheduling information is sent. Once the UE 204 decodes this downlink control channel 212, actual data transfer 214 takes place between the gNodeB 202 and the UE 204.

Figure 3:
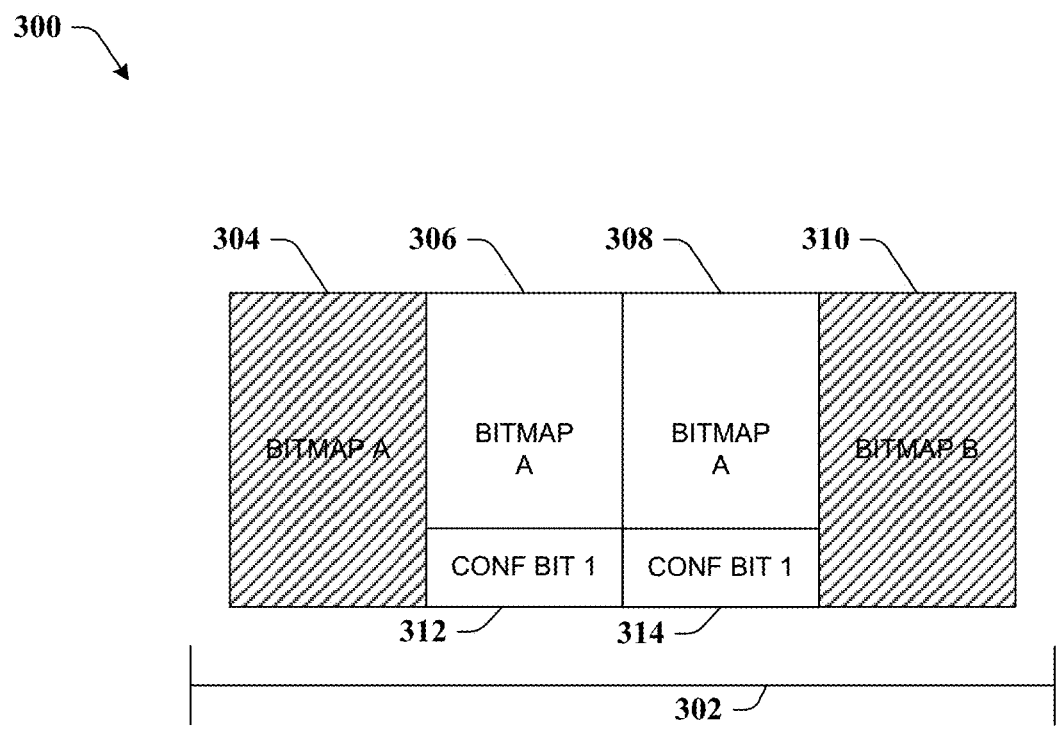
FIG. 3 illustrates an example block diagram of bandwidth parts and confirmation bits in accordance with various aspects and embodiments of the subject disclosure.

Turning now to FIG. 3, illustrated is an example block diagram 300 of bandwidth parts and confirmation bits in accordance with various aspects and embodiments of the subject disclosure.

In an embodiment, a component carrier 302 can have multiple bandwidth parts, or channels 304, 306, 308, and 310. In an embodiment, the configuration for bandwidth parts 304, 306, and 308 are the same, e.g., each uses a restriction bit map A. Instead of resending the restriction bit map A to each of bandwidth parts 306 and 308, the system can encode confirmation bits 312 and 314 to bandwidth parts 306 and 308 that indicate to the receiver or UE device that the same bit map A should be used to configure the UE for bandwidth parts 306 and 308. The lack of a confirmation bit associated with bandwidth part 310 can indicate that a new bit map (e.g., bit map B) has been encoded to configure the UE for bandwidth part 310. In other embodiments, bandwidth part 310 can have a confirmation bit set to a null value (e.g., "0") to indicate that a new restriction bit map has been sent.

It is to be appreciated that while FIG. 3, displays four bandwidth parts, in other embodiments, the component carrier 302 can include a different number of bandwidth parts, or channels.

In another embodiment, instead of sending a confirmation bit with each bandwidth part that has a matching restriction bit map, the network can send a new information element (IE) by higher layer using RRC signaling indicating whether all bandwidth parts of the carrier operation will use the same restriction bit map as that of the primary bandwidth part of that carrier already indicated or configured for the primary bandwidth part indicated by RRC signaling. Upon receiving the information element, the UE decodes this information and interprets if this bit is set to 1, then for example in four cell operation it means that the restriction bit map for each of the bandwidth parts are all equal to the primary bandwidth part and due to this, the bandwidth parts will not report channel state parameters (CQI, PMI, RI) using the precoding elements which are not set by the restriction bitmap. Note that precoding subset restriction bits are set to "1" in the primary bandwidth part.

In another embodiment, the network can send a new information element with the confirmation bit set to "0" for a bandwidth part of a component carrier and sends a new codebook subset restriction bitmap. In this case, when the UE receives the information element, the UE can decode and when it identifies that the confirmation bit is equal to 0, it erases the previous codebook subset restriction bit map and sets the bit map according to the new configuration. The channel state information parameters are reported according to the new bit map it received by RRC signaling.

In another embodiment, the network can send a new restriction bit map without sending the confirmation bit. Note that in these cases the network needs to send the bitmap which is different compared to that of primary bandwidth part's bitmap. In another embodiment, the network and the UE are configured such that if the network doesn't send either a confirmation bit or a new restriction bit map for each BWP, then it is implicitly understood by the UE that it will use the primary bandwidth part configuration (bit map) or the cell or carrier bit map.

Figure 4:
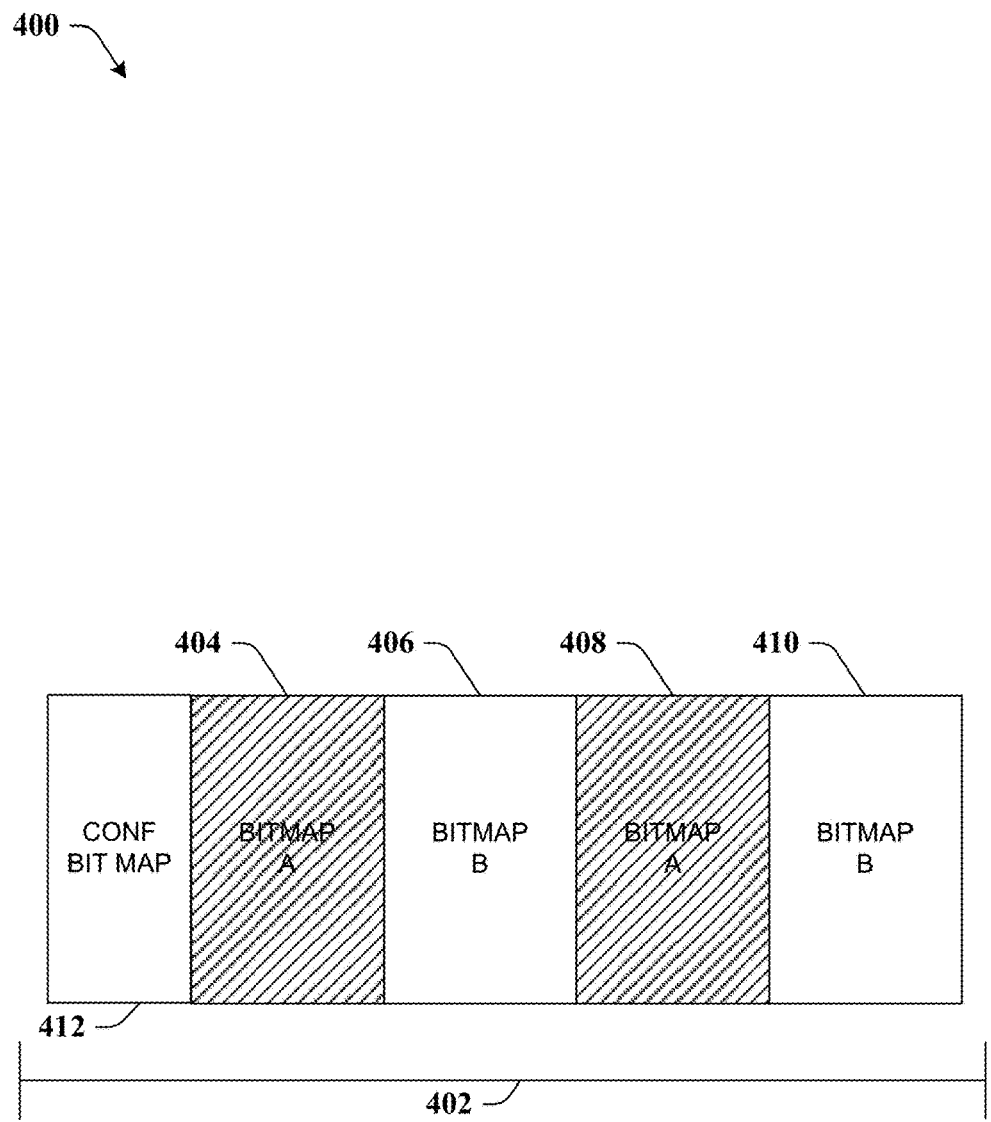
FIG. 4 illustrates an example block diagram of bandwidth parts and a confirmation bit map in accordance with various aspects and embodiments of the subject disclosure.

Turning now to FIG. 4, illustrated is an example block diagram 400 of bandwidth parts and a confirmation bit map in accordance with various aspects and embodiments of the subject disclosure.

In an embodiment, a confirmation bit map 412 can be sent via RRC signaling indicating which bandwidth parts 404, 406, 408, and 410 are grouped together, or have similar restriction bit maps. For instance, of the component carrier 402, bandwidth parts 404 and 408 can be similar, each using the same restriction bit map A, while bandwidth parts 406 and 410 can be similar, using restriction bit map B. The confirmation bit map 412 can be one or more bits mapping the relationship of the restriction bit maps, such that for each grouping, only one restriction bit map needs to be sent (e.g., in FIG. 4, one restriction bit map A with bandwidth part 404 and one restriction bit map B with bandwidth part 406.).

In an embodiment, the network can send the new IE confirmation bit map 412 to indicate to the UE that the restriction bit map for a set or a subset of bandwidth parts is equal. In case the UE support multiple BWPs in 2 bands, the UE indicates to the network the exact carrier/band combinations in "UE radio access capability". The network can indicate to the UE the specific restriction bitmap for the bandwidth part in that band, by indicating which bandwidth part in a specific band will have the same codebook subset restriction, by this the restriction bitmap will be band specific. For example, in case of four bandwidth part operations in FIG. 4, the confirmation bit map 412 can be sent from the network which indicates the various subsets of operation.

In an embodiment, if the network sends a bit map equal to 001, that can mean that the restriction bit map of bandwidth part of 3 is equal to that bandwidth part 1, while the codebook subset restriction for the third bandwidth part 408 is equal to the restriction bit map for the fourth bandwidth part 410 (this could be indicated in another bit map option, for example 101), as shown in the Table 3 below:

| Option | bitmap | Indication clarification |
|---|---|---|
| 1 | 000 | CBSR of C2 = CBSR of C1 |
| 2 | 001 | CBSR of C3 = CBSR of C1 |
| 3 | 010 | CBSR of C4 = CBSR of C1 |
| 4 | 011 | CBSR of C3 = CBSR of C2 |
| 5 | 100 | CBSR of C4 = CBSR of C3 |
| 6 | 101 | CBSR of C3 = CBSR of C2 = CBSR of C1 |
| 7 | 110 | CBSR of C4 = CBSR of C3 = CBSR of C1 |
| 8 | 111 | CBSR of C4 = CBSR of C3 = CBSR of C2 |

Note:
CBSR—codebook subset restriction, C1 Primary BWP, C2—Secondary BWP, C3—$3^{rd}$ BWP, C4—$4^{th}$ BWP As an example embodiment Table 3, for option 1, where the confirmation bit map 412 is coded "000", that can indicate that the codebook subset restriction bit map for bandwidth part two (e.g., 406) is the same as that of bandwidth part one (e.g., 404). Table 3 shows how 3 bits can be used to show all the different combinations of groupings for component carriers with four bandwidth parts or channels. Table 3 references codebook subset restriction bit maps, but the same principles can be applied to beam and rank restriction bit maps. It is also to be appreciated that in other configurations, the confirmation bit maps can have different codings for different groupings.

It is also to be appreciated that in other embodiments, the component carrier can have a plurality of confirmation bit maps, with respective confirmation bit maps for each of codebook subset restriction bit maps, rank restriction bit maps, and beam restriction bit maps. Each of the bandwidth parts in FIG. 3, can also have respective confirmation bits for each of the types of restriction bit maps as well.

Figure 5:
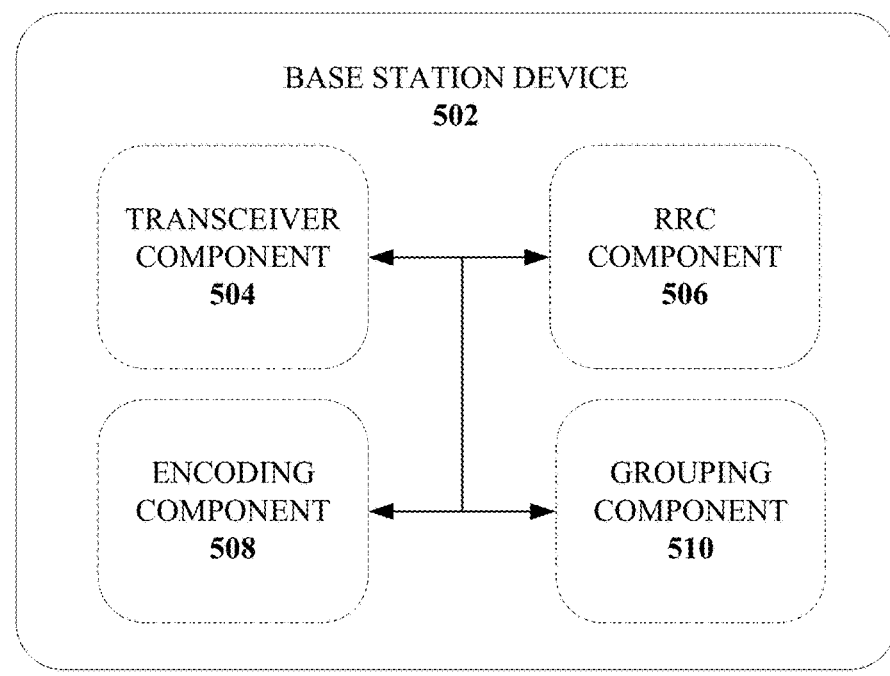
FIG. 5 illustrates an example block diagram of a base station device system in accordance with various aspects and embodiments of the subject disclosure.

Turning now to FIG. 5, illustrated is an example block diagram 500 of a base station device system 502 in accordance with various aspects and embodiments of the subject disclosure.

The base station device 502 can have an RRC component 506 that determines the codebook subset restriction bit map, rank restriction bit map, and beam restriction bit maps to configure the UE with. A grouping component 510 can determine which bandwidth parts of the component carrier are similar, and an encoding component 508 can encode confirmation bits to indicate to the UE which of the bandwidth parts are similar to avoid having to send multiple repetitive restriction bit maps. The transceiver component 504 can transmit the RRC signaling to the user equipment device.

Figure 6:
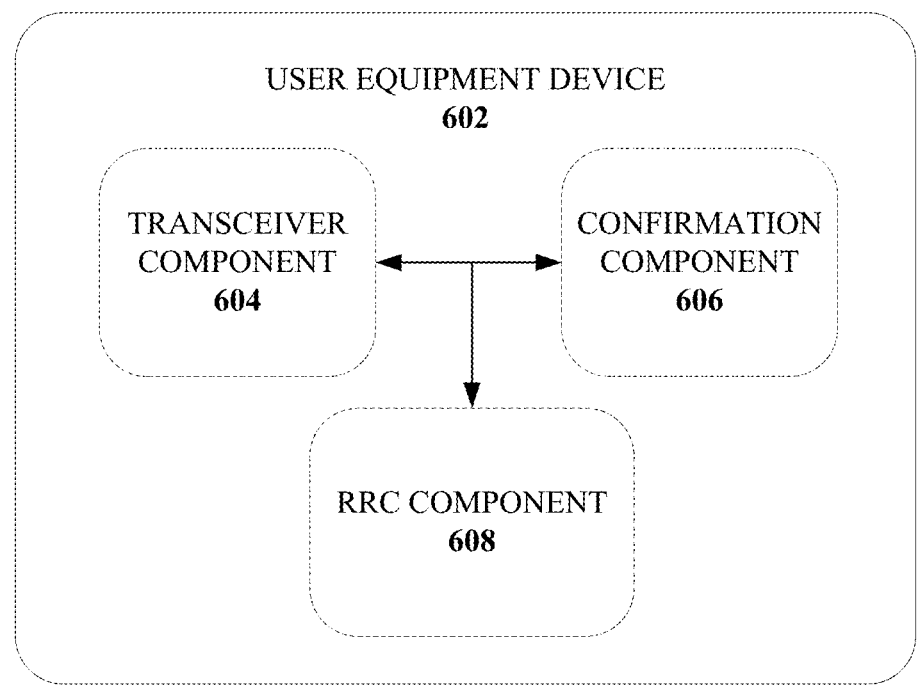
FIG. 6 illustrates an example block diagram of a user equipment device system in accordance with various aspects and embodiments of the subject disclosure.

Turning now to FIG. 6, illustrated is an example block diagram 600 of a user equipment device system 602 in accordance with various aspects and embodiments of the subject disclosure.

A transceiver component 604 receives the RRC signaling from the base station device, and an RRC component 608 applies the restriction bit maps from the RRC signaling for the primary bandwidth part. The confirmation component 606 checks to see if there is a confirmation bit in the secondary and other bandwidth parts, and if there is, the RRC component 608 applies the restriction map received for the first bandwidth part to the other bandwidth parts with the confirmation bit.

Figure 7:
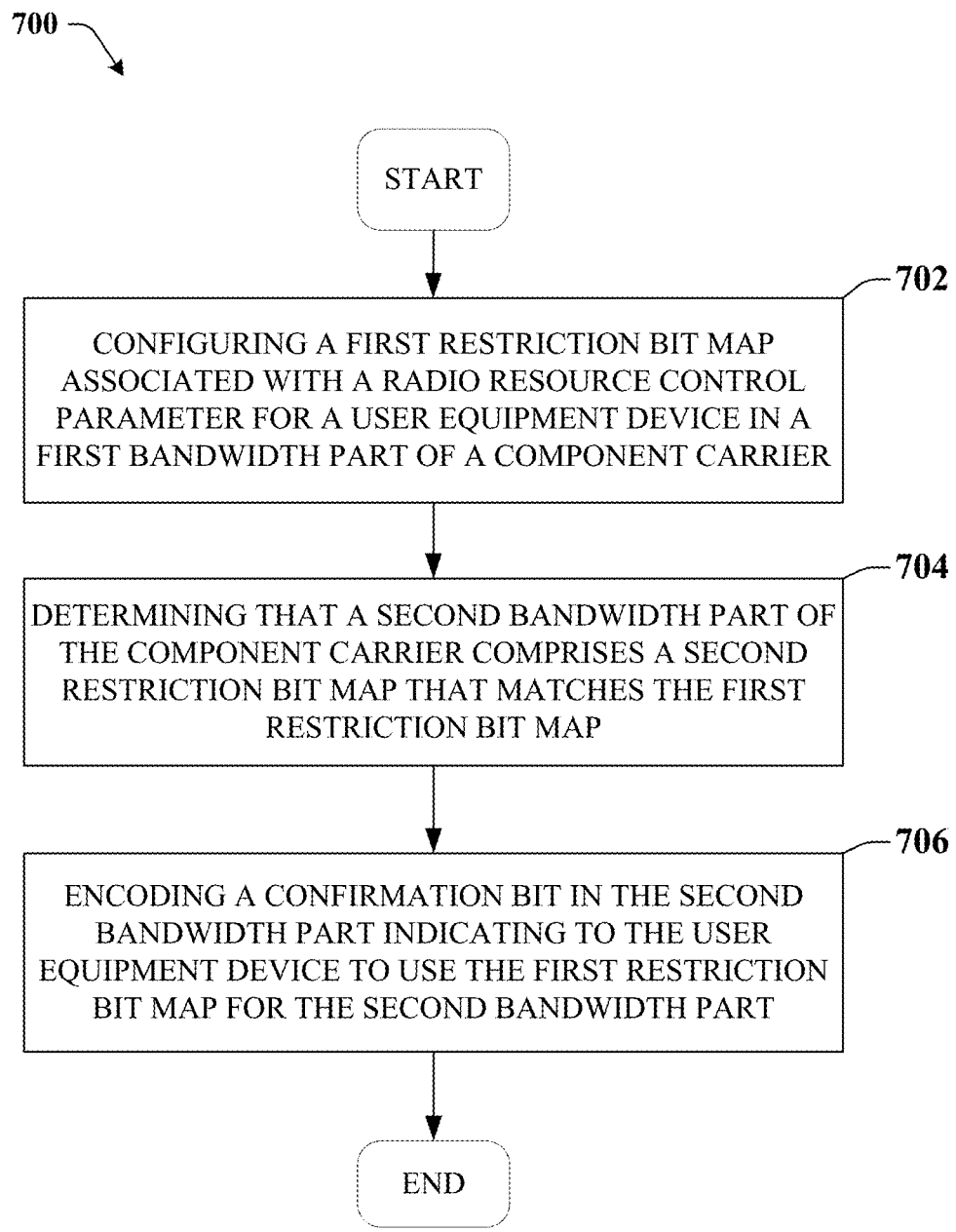
FIG. 7 illustrates an example method for reducing higher layer signaling overhead in accordance with various aspects and embodiments of the subject disclosure.
Figure 8:
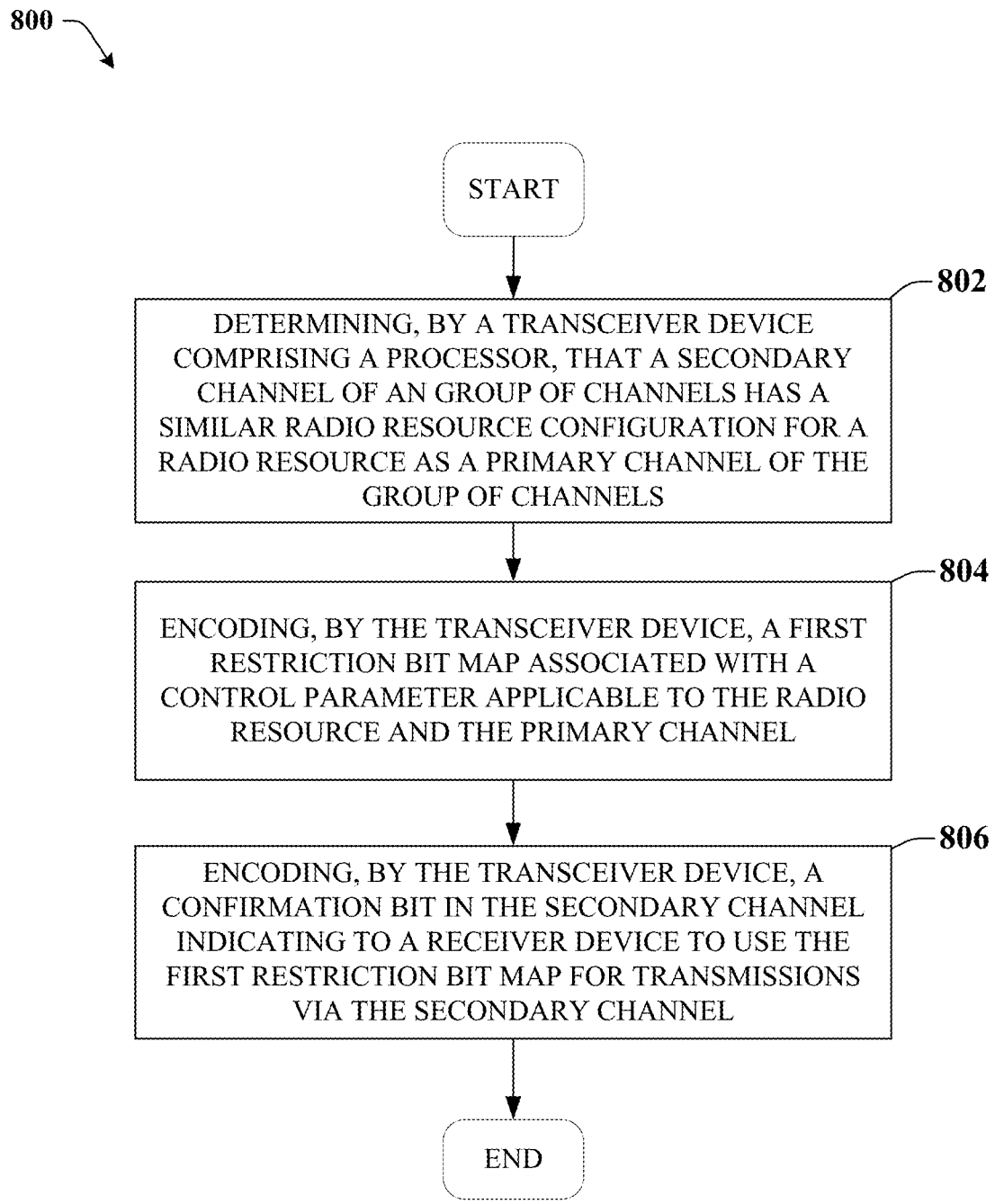
FIG. 8 illustrates an example method for reducing higher layer signaling overhead in accordance with various aspects and embodiments of the subject disclosure.

FIGS. 7-8 illustrates a process in connection with the aforementioned systems. The processes in FIGS. 7-8 can be implemented for example by the systems in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates an example method 700 for an example method for reducing higher layer signaling overhead in accordance with various aspects and embodiments of the subject disclosure.

Method 700 can start at 702, where the method comprises configuring a first restriction bit map associated with a radio resource control parameter for a user equipment device in a first bandwidth part of a component carrier.

At 704 the method comprises determining that a second bandwidth part of the component carrier comprises a second restriction bit map that matches the first restriction bit map.

At 706, the method comprises encoding a confirmation bit in the second bandwidth part indicating to the user equipment device to use the first restriction bit map for the second bandwidth part.

FIG. 8 illustrates an example method 800 for reducing higher layer signaling overhead in accordance with various aspects and embodiments of the subject disclosure.

Method 800 can start at 802, where the method comprises determining, by a transceiver device comprising a processor, that a secondary channel of a group of channels has a similar radio resource configuration for a radio resource as a primary channel of the group of channels.

At 804 the method comprises encoding, by the transceiver device, a first restriction bit map associated with a control parameter applicable to the radio resource and the primary channel.

At 806, the method comprises encoding, by the transceiver device, a confirmation bit in the secondary channel indicating to a receiver device to use the first restriction bit map for transmissions via the secondary channel.

Figure 9:
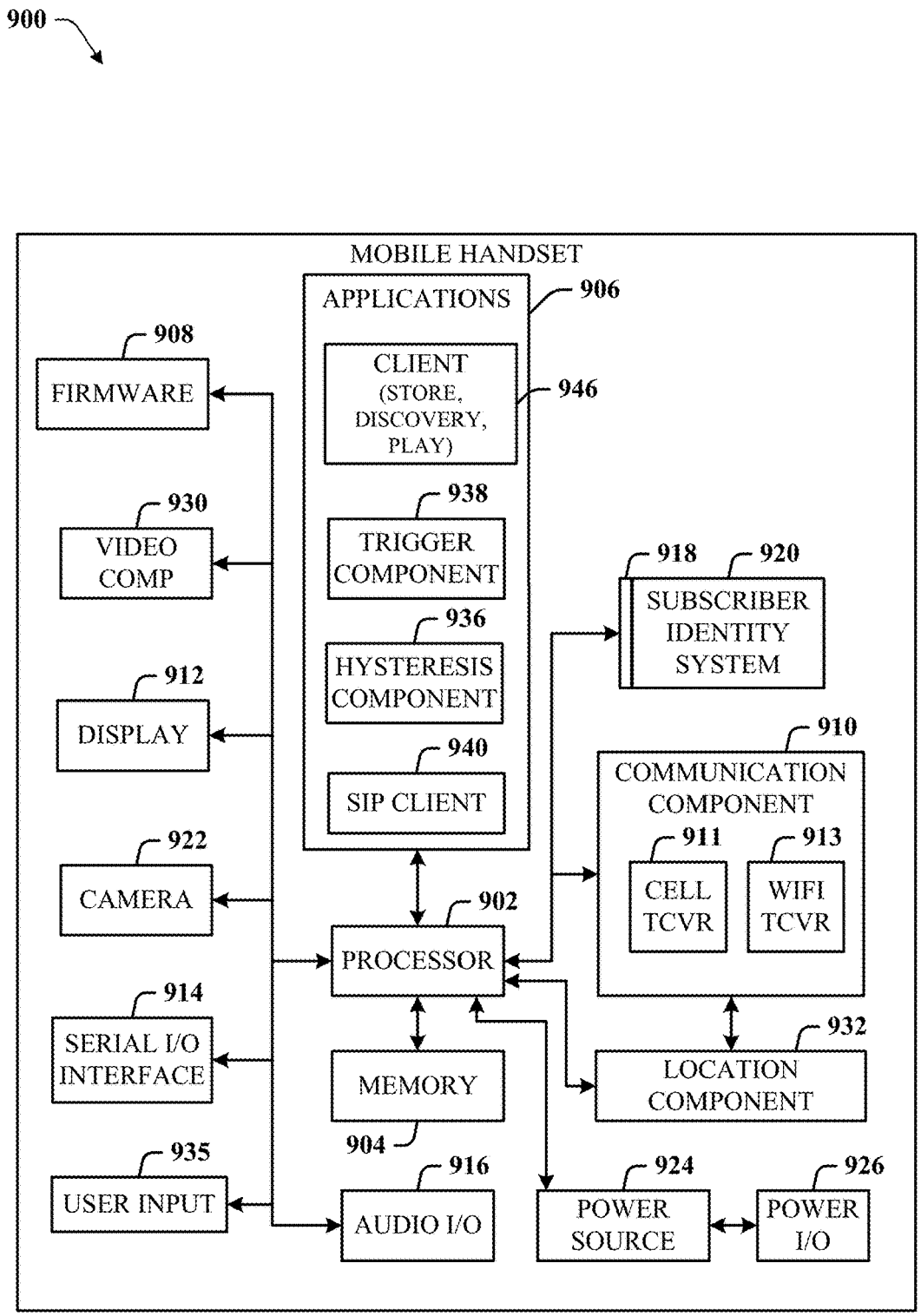
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
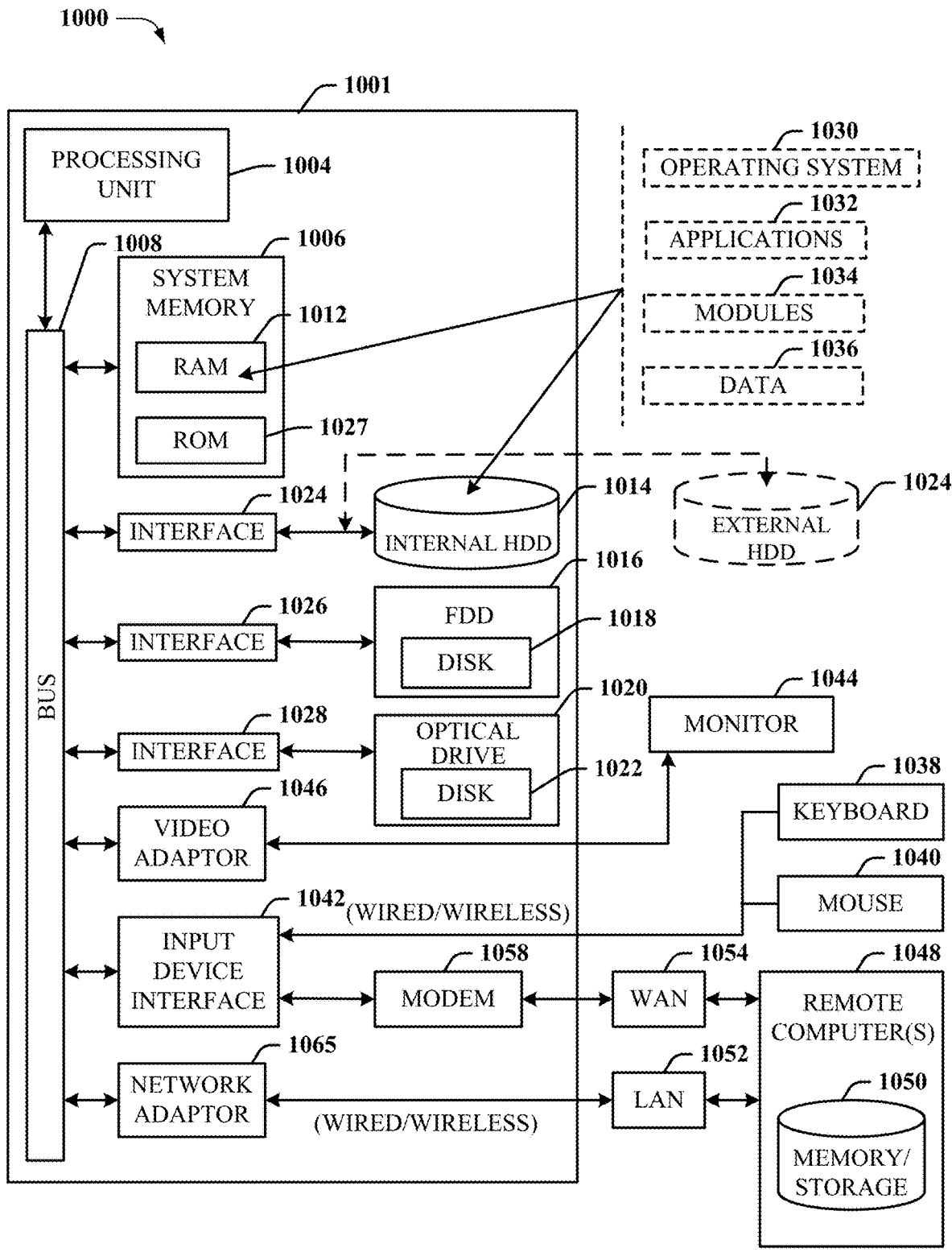
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 406) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A base station device, comprising:
a processor; and
a memory that stores executable instructions that, when executed by the processor, facilitate performance of operations, comprising:
configuring a group of first restriction bit maps, associated with a radio resource control parameter for a user equipment device, in a first bandwidth part of a component carrier bandwidth frequency, wherein the group of first restriction bit maps comprises at least a first rank restriction bit map;
determining that a second bandwidth part of the component carrier bandwidth frequency comprises a group of second restriction bit maps that comprises a second rank restriction bit map that matches the first rank restriction bit map; and
encoding an indicator in the second bandwidth part indicating to the user equipment device to use the first rank restriction bit map for the second bandwidth part.

2. The base station device of claim 1, wherein the indicator indicates that each bandwidth part of the component carrier bandwidth frequency use the first rank restriction bit map.

3. The base station device of claim 1, wherein the indicator indicates that each bandwidth part of a subset of bandwidth parts of the component carrier bandwidth frequency use the first rank restriction bit map.

4. The base station device of claim 1, wherein the indicator is a first indicator, wherein the group of first restriction bit maps comprise a first codebook subset restriction bit map; and
the operations further comprising:
determining that the group of second restriction bit maps further comprises a second codebook subset restriction bit map that matches the first codebook subset restriction bit map; and encoding a second indicator in the second bandwidth part indicating to the user equipment device to use the first codebook subset restriction bit map for the second bandwidth part.

5. The base station device of claim 1, wherein the indicator is a first indicator, wherein the group of first restriction bit maps comprise a first a beam restriction bit map; and
the operations further comprising:
determining that the group of second restriction bit maps further comprises a second beam restriction bit map that matches the first beam restriction bit map; and encoding a second indicator in the second bandwidth part indicating to the user equipment device to use the first beam restriction bit map for the second bandwidth part.

6. The base station device of claim 1, wherein the operations further comprise:
encoding a group of indicators, comprising the indicator, and wherein the group of indicators correspond to respective types of restriction bit maps of the group of first restriction bit maps.

7. The base station device of claim 1, wherein the indicator is a confirmation bit map indicating whether a first codebook subset restriction bit map, the first rank restriction bit map, and a first beam restriction bit map of the group of first restriction bit maps from the first bandwidth part are identical to a second codebook subset restriction bit map, the second rank restriction bit map, and a second beam restriction bit map of the group of second restriction bit maps of the second bandwidth part.

8. The base station device of claim 1, wherein the indicator is a confirmation bit map indicating which bandwidth parts of the component carrier bandwidth frequency comprise matching restriction bit maps.

9. The base station device of claim 8, wherein a size of the confirmation bit map is a function of a number of bandwidth parts in the component carrier bandwidth frequency and a number of antennas of the base station device.

10. The base station device of claim 1, wherein the operations further comprise:
encoding the indicator with a null value to indicate to the user equipment device to delete a previous rank restriction bit map.

11. A method, comprising:
determining, by a transceiver device comprising a processor, that a second bandwidth part of a carrier bandwidth frequency has a similar radio resource configuration for at least one restriction bit map of a group of restriction bit maps for a radio resource as a first bandwidth part of the carrier bandwidth frequency;
in response to the determining indicating the similar radio resource configuration comprises a codebook subset restriction bit map that is similar:
encoding, by the transceiver device, a first codebook subset restriction bit map associated with a control parameter applicable to the radio resource and the first bandwidth part; and
encoding, by the transceiver device, a confirmation bit in the second bandwidth part indicating to a receiver device to use the first codebook subset restriction bit map for transmissions via the second bandwidth part.

12. The method of claim 11, wherein the confirmation bit indicates that each bandwidth part of the carrier bandwidth frequency is to use the first codebook subset restriction bit map.

13. The method of claim 11, wherein the confirmation bit indicates that each bandwidth part of a subset of bandwidth parts of the carrier bandwidth frequency is to use the first restriction bit map.

14. The method of claim 11, further comprising:
encoding, by the transceiver device, a group of confirmation bits comprising the confirmation bit, each confirmation bit of the group of confirmation bits corresponding to a respective type of restriction bit map of the group of restriction bit maps.

15. The method of claim 11, further comprising:
encoding a confirmation bit map indicating whether each of the codebook subset restriction bit map, a rank restriction bit map, and a beam restriction bit map of the group of restriction bit maps from the first bandwidth part are identical in the second bandwidth part.

16. The method of claim 11, further comprising
encoding a confirmation bit map indicating which bandwidth parts of the carrier bandwidth frequency have matching restriction bit maps of the group of restriction bit maps.

17. A non-transitory machine-readable storage medium, comprising executable instructions that, when executed by a processor of a device, facilitate performance of operations, comprising:
determining that a second bandwidth part of a carrier bandwidth frequency has a similar radio resource configuration for at least one restriction bit map of a group of restriction bit maps as a first bandwidth part of the carrier bandwidth frequency;
in response to the determining indicating the similar radio resource configuration comprises a beam restriction bit map that is similar:
encoding a first beam restriction bit map associated with a radio resource control parameter for use with the first bandwidth part; and
encoding a confirmation bit in the second bandwidth part indicating to a receiver device to use the first beam restriction bit map for the second bandwidth part.

18. The non-transitory machine-readable storage medium of claim 17, wherein the operations further comprise:
encoding a group of confirmation bits, each confirmation bit of the group of confirmation bits corresponding to a respective type of restriction bit map of the group of restriction bit maps.

19. The non-transitory machine-readable storage medium of claim 17, wherein the confirmation bit indicates whether each of a codebook subset restriction bit map, a rank restriction bit map, and the beam restriction bit map of the group of restriction bit maps from the first bandwidth part are identical in the second bandwidth part.

20. The non-transitory machine-readable storage medium of claim 17, wherein the confirmation bit is a first confirmation bit, and wherein the operations further comprise, in response to the determining indicating the similar radio resource configuration comprises a rank restriction bit map that is similar:
encoding, by the transceiver device, a first rank restriction bit map associated with a control parameter applicable to the radio resource and the first bandwidth part; and
encoding, by the transceiver device, another confirmation bit in the secondary channel indicating to a receiver device to use the first rank restriction bit map for transmissions via the second bandwidth part.

\* \* \* \* \*